J. H. BROOKMIRE.
Coffee Cleaner.
No. 109,865.    Patented Dec. 6, 1870.
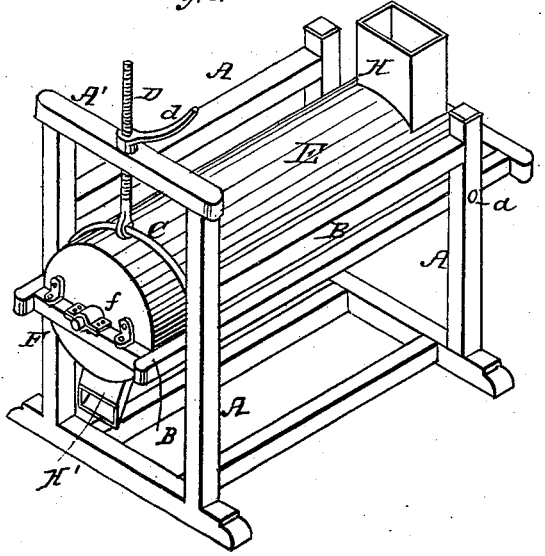
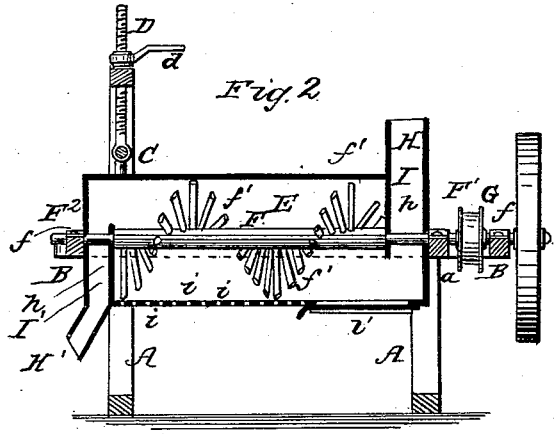

UNITED STATES PATENT OFFICE.

JAMES H. BROOKMIRE, OF ST. LOUIS, MISSOURI.

IMPROVEMENT IN APPARATUS FOR CLEANING AND POLISHING COFFEE.

Specification forming part of Letters Patent No. 109,865, dated December 6, 1870.

*To all whom it may concern:*

Be it known that I, JAMES H. BROOKMIRE, of St. Louis, in the county of St. Louis and State of Missouri, have made a certain new and useful Improved Apparatus for Cleaning and Polishing Coffee; and I do hereby declare that the following is a full and true description thereof, reference being had to the accompanying drawing, and to the letters of reference marked thereon.

This invention relates, first, to the arrangement of a stationary cylinder supported within an adjustable frame, by means whereof the coffee may be regulated in its cleaning and polishing treatment, as required; secondly, in providing within said cylinder a revolving shaft carrying spirally-arranged beaters or polishers, whereby a continuous rotary and feeding action is achieved; thirdly, in forming feed and discharge chambers within the cylinder, by arranging within the same semicircular heads; and, lastly, said invention relates to certain detail parts of construction, hereinafter to be more fully described.

To enable those herein skilled to make and use my said invention, I will now more fully describe the same, referring to the accompanying—

Figure 1 as a perspective view; to Fig. 2 as a longitudinal section.

The operative parts of my machine are supported upon a suitable frame, A. Within the frame A, I have arranged a second frame, B, having one end thereof pivoted at $a$, and supported at the other end by a bracket, C, held by a screw, D, secured by a hand-nut, $d$, to a cross-timber, A', of the frame A, as clearly shown in Fig. 1. The frame B carries the cylinder E, having closed heads, and secured stationary to the frame B in any proper manner. As the frame B (carrying the cylinder E) is thus arranged adjustably, the operator, by means of the screw D, is readily enabled to subject the coffee to a cleaning and polishing treatment, as the nature of the coffee requires, and to discharge the cleaned coffee without interfering with the process of treatment.

Within the cylinder E, I have arranged a horizontal shaft, F, constructed as a continuation of the respective bearing-shafts $F^1$ and $F^2$, resting in proper journals $f$ on each end of the frame B. Said shaft F, I provide with proper beaters or polishers $f'$, arranged spirally, as clearly shown in Fig. 2.

To operate the shaft F with the usual motive power, a pulley, G, is arranged on the extension bearing-shaft $F^1$ at the rear end of the frame B. The belting passes around said pulley G horizontally, so as to be retained in position as the cylinder-frame is being raised or lowered.

The cylinder E, I provide with a proper feed-hopper, H, at the top end, and at the opposite bottom end with a discharge hopper or chute, H'.

Furthermore, in order to regulate the feeding and discharge action of the coffee while being treated by the beaters $f'$, I have arranged, in line with the respective feed and discharge openings H H', the semi cylinder-heads $h$ and $h'$, and secured the same in reversible positions within the cylinder, as clearly shown in Fig. 2. A feed-chamber, I, is thus formed, which causes the coffee, as it is fed in the hopper H, to enter at the bottom of the cylinder, and, when sufficiently subjected to treatment, to escape at the top of the cylinder, passing through the discharge-chamber I', from thence through the chute H into a proper receiver or receptacle.

It will be observed that while the coffee is subjected to the required process of cleaning by the action of the revolving beaters and polishers $f$, the coffee is at the same time continually fed and carried forward to the discharge-chamber I', thus being discharged without interfering with the feeding action or process of cleaning and polishing.

At its bottom the cylinder E has a series of perforations, $i$, through which the dust, chaff, and other impurities are allowed to escape; also, by means of a proper sliding door, $i'$, as soon as the cylinder is tipped up or raised, an entire discharge of contents in the cylinder is readily effected.

My improved machine is simple, compact, cheaply made, and durable.

In its operation the grain may be retained in the cylinder a longer or shorter time, according to the kind operated upon, and in its action most perfectly cleans, scours, and polishes the coffee, without experiencing loss of time and labor in feeding and discharging.

Having thus fully described my said invention, what I claim is—

1. The stationary cylinder E, having semi cylinder-heads $h\ h'$, forming feed and discharge chambers I I', center shaft, F, spirally-arranged beaters, and polishers $f$, when arranged, in combination with the frames B and A, substantially as set forth.

2. The pulley G, extension-shafts $F^1 F^2$, center shaft, F, beaters $f$, cylinder E, frame B, bracket C, and screw D, when arranged adjustably in combination with the frame A, substantially as set forth.

In testimony of said invention I have hereunto set my hand.

JAS. H. BROOKMIRE.

Witnesses:
WILLIAM W. HERTHEL,
ROBERT BURNS.